United States Patent [19]

Kitai et al.

[11] 4,062,029

[45] Dec. 6, 1977

[54] LENS SHUTTER ACTUATING DEVICE FOR QUICK-RETURN TYPE SINGLE-LENS REFLEX CAMERA

[75] Inventors: Kiyoshi Kitai, Tokyo; Yukio Nakamura, Yotsukaido; Shogo Kato, Daiei; Shinji Nagaoka, Yotsukaido, all of Japan

[73] Assignee: Seiko Koki Kabushiki Kaisha, Japan

[21] Appl. No.: 652,815

[22] Filed: Jan. 27, 1976

Related U.S. Application Data

[63] Continuation of Ser. No. 461,805, April 17, 1974, abandoned.

[30] Foreign Application Priority Data

Apr. 19, 1973 Japan .................................. 48-43652

[51] Int. Cl.² .......................... G03B 9/00; G03B 9/08
[52] U.S. Cl. .................................. 354/232; 354/154; 354/231; 354/233
[58] Field of Search ............... 354/154, 231, 232, 233

[56] References Cited

U.S. PATENT DOCUMENTS

| 3,027,819 | 4/1962 | Reiche et al. | 354/154 |
|---|---|---|---|
| 3,074,333 | 1/1963 | Hahn et al. | 354/154 |
| 3,094,913 | 6/1963 | Morelle | 354/154 |
| 3,158,075 | 11/1964 | Ohara | 354/156 |
| 3,165,042 | 1/1965 | Higuchi | 354/154 |
| 3,191,514 | 6/1965 | Ohara | 354/156 |
| 3,218,949 | 11/1965 | Kiper | 354/233 |
| 3,230,855 | 1/1966 | Kiper | 354/233 |
| 3,254,584 | 6/1966 | Okajima | 354/154 |
| 3,487,759 | 1/1970 | Fahlenberg | 354/154 |

*Primary Examiner*—Russell E. Adams
*Attorney, Agent, or Firm*—Robert E. Burns; Emmanuel J. Lobato; Bruce L. Adams

[57] ABSTRACT

A single-lens reflex camera shutter having an operating ring driven in one direction by a gear-rack and pinion combination. The operating ring actuates the diaphragm and shutter blades and is stopped by a stop lever during the taking of an exposure. The stop lever is locked during the taking of an exposure by a signal lever that signals the taking of an exposure and is released upon completion of an exposure to allow the operating ring to continue in its travel and carry out opening of the shutter and opening of the diaphragm blades.

2 Claims, 4 Drawing Figures

LENS SHUTTER ACTUATING DEVICE FOR QUICK-RETURN TYPE SINGLE-LENS REFLEX CAMERA

This is a continuation of application Ser. No. 461,805, filed Apr. 17, 1974, now abandoned.

BACKGROUND OF THE INVENTION

This invention relates generally to single-lens reflex cameras and more particularly to a new and improved shutter and the actuating device therefore.

Heretofore single-lens reflex cameras having a signal lever for indicating completion of an exposure have used this lever to control releasing a driving member for driving a shutter-operating ring to operate the shutter blades and the diaphragm blades. A complicated mechanism is required having an interengaging mechanism coupling the driving member and the operating ring.

SUMMARY OF THE INVENTION

A principal object is the provision of a lens shutter actuating device for quick-return type single-lens reflex cameras that is simple.

The shutter according to the invention has an operating ring for operating the shutter and diaphragm blades driven in one direction by a driving element through a rack-and-pinion arrangement coupling them. The operating ring is stopped during its rotation by a stop lever that releasably locks the stop lever during taking of an exposure after the operating ring movement has set a diaphragm opening and opened the shutter blades.

Upon completion of an exposure the signal lever releases the stop lever while signalling completion of the exposure. This releases the operating ring so that it continues its travel to open the shutter blades and open the diaphragm.

BRIEF DESCRIPTION OF THE DRAWINGS

Other objects and advantages will appear from the following description of an example of the invention, and the novel features will be particularly pointed out in the appended claims.

DESCRIPTION OF A PREFERRED EMBODIMENT

Figure 1:
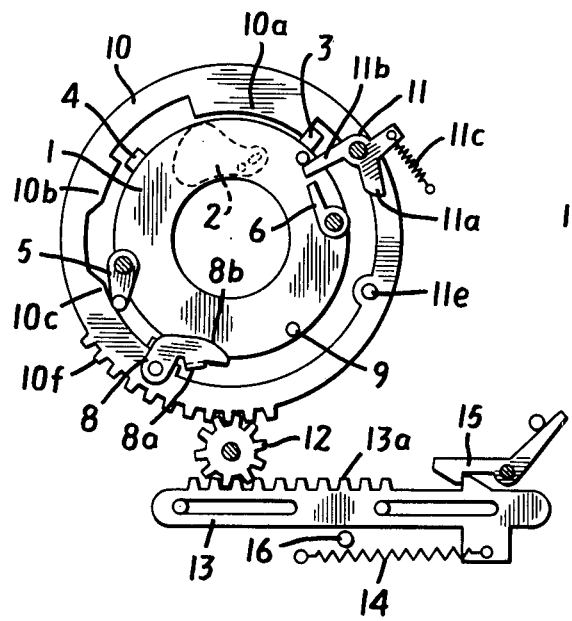
FIG. 1 is a plan view of a shutter embodying an actuating device according to the invention and illustrated in a cocked condition, in this state the shutter blades are open for focusing.

A shutter according to the invention is shown in the drawings in which a shutter case 1 has an exposure aperture and within which shutter blades 2 are disposed. Only one shutter blade is shown. The shutter blades are arranged about the exposure aperture. The shutter has a set lever 3, a shutter release lever 4 and an opening lever 5 for freely opening the shutter blades separately from actuation thereof for taking of an exposure. The opening lever 5 closes the shutter blades when it is turned in a clockwise direction from the position shown in FIG. 1; in which the shutter is shown in a cocked condition.

The shutter has a well known indicating or signal lever 6 which is pivotally mounted and is angularly displaced to indicate or signal when an exposure is completed. A diaphragm-operating plate 7 is biased by a clockwise rotary force applied by a spring 7a and is limited as to travel by a stop, not shown, within the shutter case. A diaphragm lever 8 for supporting the diaphragm-operating plate is pivotally mounted on a shutter-operating ring 10 and biased in a counterclockwise direction by a spring, not shown, against a stop 9. The operating ring 10 has an inward projection or sector 10a by which the set lever 3 and the release lever 4 can be actuated. Cams 10b, 10c provided on the opening ring 10 open the shutter blades in engaging with the opening lever 5. A pin 11e stops the operating ring 10 once when it strikes against an arm 11a of a stop lever 11. The operating ring 10 has a gear rack 10f formed along a sector of the periphery thereof. The gear rack meshes with a rotary pinion 12.

The stop lever 11 is pivoted at a fixed point in the vicinity of the operating ring 10 and has an arm 11b through which it engages the signal lever 6. The stop lever 11 is biased in a clockwise direction by a spring 11c. Below the pinion 12 is mounted a driving rod 13 having a gear rack 13a meshing with the pinion and biased in a direction toward the left by a biasing spring 14. The driving rod is releasably held in a cocked position toward the right against the force of the spring by a hook or release lever 15. A stop 16 limits the leftward movement of the rod 13 once released.

OPERATION

Figure 2:
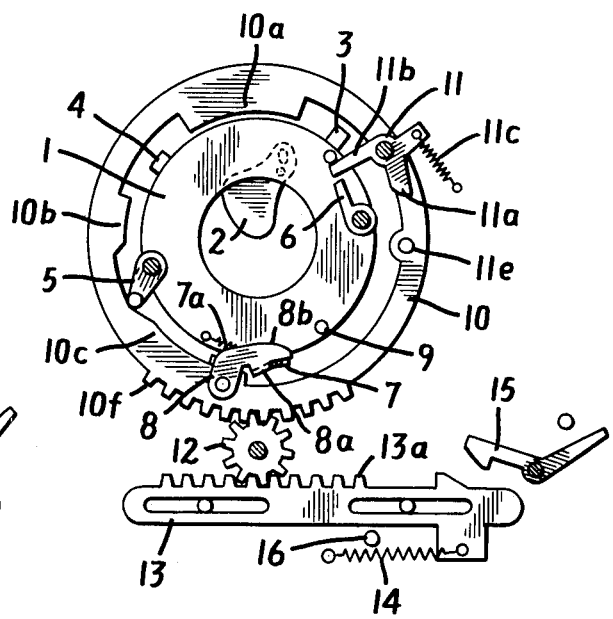
FIG. 2 is a plan view of the shutter in FIG. 1 illustrating the position of the elements of the shutter in FIG. 1 while the shutter blades are temporarily closed prior to taking of an exposure.

In order to take an exposure the release lever 15 is actuated in a clockwise direction thereby releasing the driving rod 13 from its locked position. The driving rod once released travels toward the left and rotates the operating ring 10 in a counterclockwise direction through the pinion 12. The rotary movement of the opening ring releases the opening lever 5 from being held by the cam 10c as shown in FIG. 2 and the shutter blades are closed. Simultaneously therewith the bent part or tab 8a of the diaphragm lever 8 on the operating ring 10 moves to a position where it is engaged with the diaphragm-operating plate as shown in FIG. 2.

Figure 3:
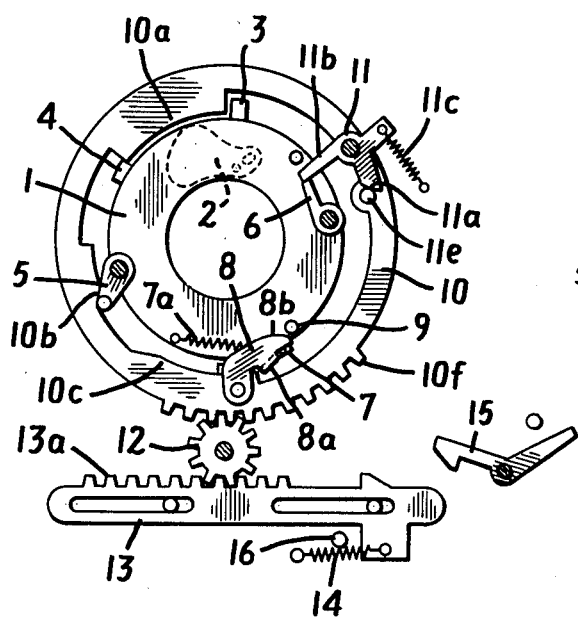
FIG. 3 is a plan view of the shutter in FIG. 2 illustrating the shutter in a released condition and taking an exposure.

As the opening ring is rotated the inner projection 10a pushes the shutter release lever 4 to release or open the shutter as shown in FIG. 3 and the exposure starts. Immediately after that the operating ring 10 is stopped from rotating as its pin 11e engages an arcuate end of the arm 11a of the stop lever 11 and cams it angularly and makes it turn a little in a counterclockwise direction. The other arm 11b of the stop lever 11 is then locked by the signal lever 6.

A required diaphragm aperture is realized at this time by rotary displacement of the diaphragm-operating plate supported by the diaphragm lever. The diaphragm blades are not shown. This condition is illustrated in FIG. 3. If the signal lever 6 is displaced after exposure is completed the opening ring turns further while the pin 11e on the opening is turning the stop lever 11 in a counterclockwise direction against the force of its biasing spring 11c and reopens the blades holding down the opening lever by means of the cam 10b. At the same time the cam 8b of the diaphragm lever also comes into contact with the pin 9 on the shutter case and displaces in a clockwise direction then the tab 8a, normal to the plane of the drawing, and the diaphragm-operating plate are released from locking and the diaphragm-operating plate is returned to its original position by the biasing spring 7a and the diaphragm blades, not shown, are opened. When the opening ring is rotated to this position the driving rod engages its stop 16 and its travel is completed. This state is illustrated in FIG. 4.

Figure 4:
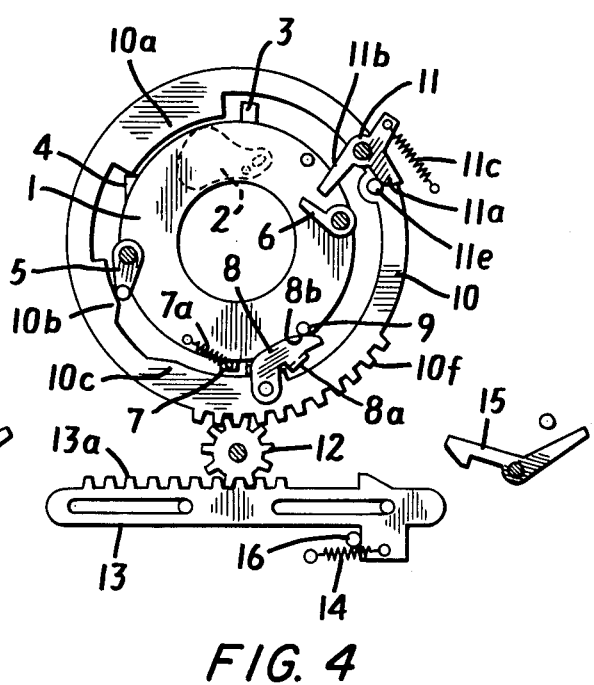
FIG. 4 is a plan view of the shutter in FIG. 3 in a condition after taking of an exposure, in this state the shutter blades are reopened for focusing.

Setting or cocking is accomplished by moving the driving rod 13 from the state shown in FIG. 4 to the right and locking it with the release lever 15. The biasing spring is accordingly tensioned. At the same time the shutter is cocked by the inward projection 10a of the opening ring. The diaphragm lever 8 returns to the position shown in FIG. 1 as the inside of its tab 8a against the diaphragm-operating plate then displaces in a clockwise direction and is carried beyond it. The stop 11 rotates in a clockwise direction under control of its biasing spring 11c and returns to its original position illustrated in FIG. 1.

Those skilled in the art will understand that the shutter is for a single lens reflex camera of the type shown in United States Letters Pat. No. 3,158,075 and has a reflex mirror, not shown, which is in a "down" position when the shutter is open for focusing during the cocked condition shown in FIG. 1. When the shutter is in the condition shown in FIG. 2 the shutter is closed continuously and the mirror is in an "up" position. In the shutter condition shown in FIG. 3 the shutter is opened and then closed for effecting an exposure. In the condition illustrated in FIG. 4 the mirror is in its "down" position continuously and the shutter is again open for focusing.

Furthermore, those skilled in the art will know that the reflex mirror may be operated by association with the reciprocable driving mechanism of the present invention.

What we claim and desire to secure by Letters Patent:

1. In a lens shutter for a quick-return type single lens reflex camera, shutter blades, a single shutter-operating ring for closing and opening the shutter for focusing independently of an exposure operation and for taking of an exposure, driving means for rotating the shutter-operating ring in one direction for closing the shutter blades and reopening the shutter blades for taking an exposure, a signal lever continuously free of said shutter-operating ring rotatable when an exposure is completed, a stop lever pivotally mounted at a fixed point in the vicinity of said shutter-operating ring stopping the rotation of the shutter-operating ring after said shutter-operating ring releases the shutter and opens the shutter blades for taking an exposure, said stop lever being disposed for engaging said signal lever and being locked thereby holding the shutter-operating ring stopped until an exposure is completed, a pin on said shutter-operating ring for engaging said stop lever and camming it in a direction for directly engaging said signal lever and being held thereby for precluding rotation of said shutter-operating ring until release of said stop lever by said signal lever, and when an exposure is completed said signal lever is rotated and releases said stop lever effective to release said pin allowing continued rotation of said shutter-operating ring in said one direction for reopening the shutter blades.

2. In a lens shutter for a quick-return type single-lens reflex camera according to claim 1, in which said shutter-operating ring comprises a gear sector on the outer periphery thereof, said driving means comprising a pinion meshing with said gear sector and a reciprocable driving rod comprising a gear rack for rotation of the pinion to drive the shutter-operating ring in said one direction, means constantly biasing the driving rod axially for driving said pinion, and release means releasably locking the driving rod.

* * * * *